United States Patent
Strongin et al.

(10) Patent No.: US 6,219,745 B1
(45) Date of Patent: Apr. 17, 2001

(54) SYSTEM AND METHOD FOR ENTERING A STREAM READ BUFFER MODE TO STORE NON-CACHEABLE OR BLOCK DATA

(75) Inventors: Geoffrey S. S. Strongin, Austin; Norm M Hack, Pflugerville, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/060,992

(22) Filed: Apr. 15, 1998

(51) Int. Cl.$^7$ ........................................ G06F 13/00
(52) U.S. Cl. .................. 711/100; 711/138; 711/155; 711/218; 710/52
(58) Field of Search ......................... 711/118, 138, 711/155, 137, 218, 217, 100; 710/52, 56

(56) References Cited

U.S. PATENT DOCUMENTS

| 5,091,845 | * | 2/1992 | Rubinfeld | 714/2 |
|---|---|---|---|---|
| 5,091,846 | * | 2/1992 | Sachs et al. | 711/130 |
| 5,442,747 | * | 8/1995 | Chan et al. | 345/509 |
| 5,561,780 | | 10/1996 | Glew et al. | 711/126 |
| 5,586,294 | * | 12/1996 | Goodwin et al. | 711/137 |
| 5,664,148 | | 9/1997 | Mulla et al. | 711/138 |
| 5,692,168 | * | 11/1997 | McMahan | 712/237 |
| 5,708,784 | | 1/1998 | Parks et al. | 710/119 |
| 5,737,565 | * | 4/1998 | Mayfield | 711/213 |
| 5,740,398 | | 4/1998 | Quattromani et al. | 711/117 |
| 5,761,706 | * | 6/1998 | Kessler et al. | 711/118 |
| 5,870,599 | * | 2/1999 | Hinton et al. | 712/239 |
| 5,958,040 | * | 9/1999 | Jouppi | 711/218 |
| 5,963,981 | * | 10/1999 | Martin | 711/170 |
| 6,032,225 | * | 2/2000 | Shiell et al. | 711/117 |
| 6,044,438 | | 3/2000 | Otnowich | 711/130 |

* cited by examiner

Primary Examiner—Glenn Gossage
(74) Attorney, Agent, or Firm—Conley, Rose & Tayon, PC; B. Noël Kivlin

(57) ABSTRACT

A computer system is described including a CPU core, a memory device storing non-cacheable data, and a bus interface unit (BIU) coupled between the CPU core and the memory device. The CPU core accesses the memory device via the BIU. The BIU includes a stream read buffer, and the system includes logic to determine when to enter a stream read buffer mode. includes a stream read buffer. Following at least one transaction accessing the non-cacheable data within the memory device, the BIU obtains a portion of the non-cacheable data from the memory device, and stores the portion within the stream read buffer. For example, the memory device may include multiple storage locations for storing the non-cacheable data, and the storage locations may have consecutive addresses. Following the least one transaction accessing the non-cacheable data, the BIU may obtain the contents of multiple, consecutively-addressed storage locations of the memory device, and store the contents within the stream read buffer. The stream read buffer may thus be used to store large blocks of non-cacheable data from the memory device. As the CPU core is able to access the stream read buffer faster than the memory device, the efficiencies of data transactions directed to the memory device may be increased. The CPU core may include circuitry for monitoring transactions accessing the non-cacheable data within the memory device.

35 Claims, 3 Drawing Sheets

SYSTEM AND METHOD FOR ENTERING A STREAM READ BUFFER MODE TO STORE NON-CACHEABLE OR BLOCK DATA

BACKGROUND OF THE INVENTION

1. Field of the Invention

The present invention generally relates to computer systems which include components that are subject to cycles in which data is read, modified and written back by a central processing unit (CPU) or other system device. Still more particularly, the present invention relates to a computer system implementation in which non-cacheable data or data in block-oriented devices can be selectively read in relatively large blocks and temporarily stored in a stream read buffer during a special mode of operation of the CPU.

2. Description of the Relevant Art

For most computer systems, the number of clock cycles required for a data access to a memory device depends upon the component accessing the memory and the speed of the memory unit. Most of the memory devices in a computer system are slow compared to the clock speed of the central processing unit (CPU). As a result, the CPU is forced to enter wait states when seeking data from the slower memory devices. Because of the relative slowness of most memory devices, the efficiency of the CPU can be severely compromised. As the operating speed of processors increases and as new generations of processors evolve, it is advantageous to minimize wait states in memory transactions to fully exploit the capabilities of these new processors.

In an effort to reduce wait states, it has become commonplace to include one or more cache memory devices in a computer system. A cache memory is a high-speed memory unit interposed in the memory hierarchy of a computer system generally between a slower system memory (and/or external memory) and a processor to improve effective memory transfer rates and accordingly improve system performance. The cache memory unit is essentially hidden and appears transparent to the user, who is aware only of a larger system memory. The cache memory usually is implemented by semiconductor memory devices having access times that are comparable to the clock frequency of the processor, while the system and other external memories are implemented using less costly, lower-speed technology.

The cache concept is based on the locality principle, which anticipates that the microprocessor will tend to repeatedly access the same group of memory locations. To minimize access times of this frequently used data, it is stored in the cache memory, which has much faster access times than system memory. Accordingly, the cache memory may contain, at any point in time, copies of information from both external and system memories. If the data is stored in cache memory, the microprocessor will access the data from the cache memory and not the system or external memory. Because of the cache memory's superior speed relative to external or system memory, overall computer performance may be significantly enhanced through the use of a cache memory.

A cache memory typically includes a plurality of memory sections, wherein each memory section stores a block or a "line," of two or more words of data. A line may consist, for example, of four "doublewords" (wherein each doubleword comprises four 8-bit bytes). Each cache line has associated with it an address tag that uniquely associates the cache line to a line of system memory.

According to normal convention, when the processor initiates a read cycle to obtain data or instructions from the system or external memory, an address tag comparison first is performed to determine whether a copy of the requested information resides in the cache memory. If present, the data is used directly from the cache. This event is referred to as a cache read "hit." If not present in the cache, a line in memory containing the requested word is retrieved from system memory and stored in the cache memory. The requested word is simultaneously supplied to the processor. This event is referred to as a cache read "miss."

In addition to using a cache memory during data retrieval, the processor may also write data directly to the cache memory instead of to the system or external memory. When the processor desires to write data to memory, an address tag comparison is made to determine whether the line into which data is to be written resides in the cache memory. If the line is present in the cache memory, the data is written directly into the line in cache. This event is referred to as a cache write "hit." A data "dirty bit" for the line is then set in an associated status bit (or bits). The dirty status bit indicates that data stored within the line is dirty (i.e., modified), and thus, before the line is deleted from the cache memory or overwritten, the modified data must be written into system or external memory. This procedure for cache memory operation is commonly referred to as "copy back" or "write back" operation. During a write transaction, if the line into which data is to be written does not exist in the cache memory, the data typically is written directly into the system memory. This event is referred to as a cache write "miss".

While cache memory devices have proven effective in reducing latency times in processors, there are certain memory devices which contain data that cannot be cached in a cache memory. Video and graphics cards are examples of devices that contain data that typically is not cacheable. CPU accesses to memory devices which contain non-cacheable data thus tend to be inefficient because the data cannot be stored in cache memory, but instead must be directly accessed from the slower memory devices. Thus, despite the fact that cache memories do improve system efficiency and reduce CPU latency, there are a number of components in computer systems which are being accessed in an inefficient manner because the data stored in these devices is non-cacheable.

SUMMARY OF THE INVENTION

The present invention solves the shortcomings and deficiencies of the prior art by constructing a computer system which implements a stream read buffer (SRB) for temporary storage of data from block-oriented components. The computer system preferably includes a CPU core connected to a local bus interface unit (BIU) by a CPU local bus. The BIU preferably connects to peripheral devices and to a memory control unit (MCU) through a system bus. In the preferred embodiment, the SRB includes a plurality of buffers with a length of N bytes. The stream read buffer preferably is incorporated in the CPU local bus interface unit (BIU), but may also be located in a separate buffer coupled to the system bus (and external to the CPU core), or as a dedicated part of cache memory. The SRB may be used when accessing addresses which are non-cacheable to temporarily store data from the accessed device for subsequent modify and write operations.

Data preferably is read in large blocks from the device to be accessed and is loaded into the stream read buffer. In the preferred embodiment, the CPU monitors instructions on the local and system busses, as well as information supplied by the memory sub-systems. The CPU uses and processes this information to determine if it should enter a special stream read buffer mode of operation. The use of this information enables the CPU to enter the special stream read buffer mode without extensions to the architectural definition of the CPU or other changes to the operating code. In the preferred embodiment, data is loaded into the SRB whenever the CPU core is placed in a special mode, as indicated by a SPECIAL control signal from the CPU.

BRIEF DESCRIPTION OF THE DRAWINGS

Other objects and advantages of the invention will become apparent upon reading the following detailed description and upon reference to the accompanying drawings in which.

Figure 1:
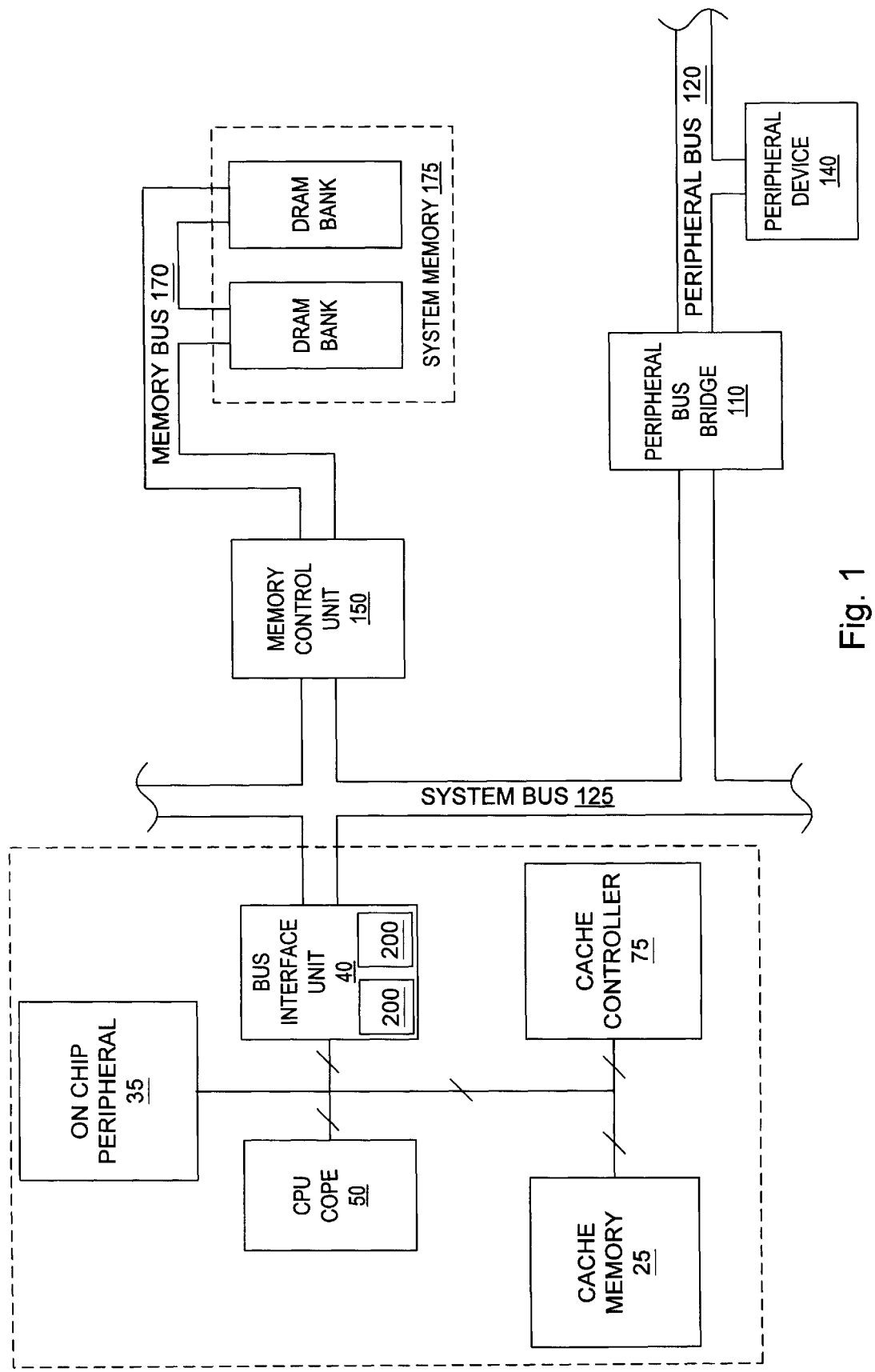
FIG. 1 is a diagram of an exemplary computer system implementing a stream read buffer in accordance with the principles of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a diagram of a general computer system 10 for implementing the present invention. The computer system 10, in accordance with generally known conventions, includes a microprocessor or "processor" 100 which functions as the brains of the computer system 10. Processor 100 preferably includes a CPU core 50 coupled to a cache memory 25 and a cache controller 75 by a local bus 165. CPU core 50, cache memory 25, and cache controller 75 are coupled to a system bus 125 via a local bus interface unit (BIU) 40. An on chip peripheral device 35 also connects to the local bus. As one skilled in the art will understand, any of the peripheral components of the processor 100, such as cache memory 25, may be located externally from the processor 100. Similarly, other components shown as external to the processor 100 in FIG. 1 may be integrated as part of microprocessor 100. As will be understood by one of ordinary skill in the art, in such a situation, the system bus 125 may form part of the CPU local bus 165.

The computer system 100 also preferably includes a peripheral bus bridge 110 and a memory controller or control unit 150, all connected to the processor 100 via system bus 125. The peripheral bus bridge 110 provides an interface between an external peripheral bus 120 and the system bus 125 and orchestrates the transfer of data, address and control signals between these busses in accordance with known techniques.

As shown in FIG. 1, an external system memory 175 also preferably couples to system bus 125 through memory bus memory controller or control unit 150. The memory control unit 150 of FIG. 1 couples to the system bus 125 and to memory bus 170 to control memory transactions between system components and system memory 175. The system memory 175 typically includes banks of dynamic random access memory (DRAM) circuits. In FIG. 1, two DRAM banks are shown for purposes of illustration, with the understanding that additional banks may be added if desired. The DRAM banks, according to normal convention, comprise the working memory of the integrated processor 100. The memory bus 170, which interconnects the DRAM circuits to the memory controller or control unit 150, includes memory address lines, memory data lines, and various control lines. In accordance with the exemplary embodiment of FIG. 1, the memory control unit 150 may also connect to a read only memory (ROM) device (not shown) via the memory bus 170. The ROM device may store the BIOS (basic input/output system) instructions for the computer system. As one of ordinary skill in the art will understand, the BIOS ROM may be located elsewhere in the computer system if desired.

An alternate peripheral device 140, such as a direct memory access (DMA) controller or other device, also may couple to peripheral bus 120. In its illustrated form, computer system 100 embodies a single processor, single-cache architecture. It is understood, however, that the present invention may be adapted to multi-processor and/or multi-cache systems. It is further understood that a variety of other devices may be coupled to peripheral bus 120. The peripheral bus may comprise a peripheral component interconnect (PCI) bus, an industry standard architecture (ISA) bus, an extended industry standard architecture (EISA) bus, or any other standard bus. Peripheral device 140 may be illustrative of a variety of bus mastering devices. Exemplary alternate bus masters include disk drives, CD ROM units, and local area network (LAN) devices.

The CPU core 50 is illustrative of, for example, a PENTIUM-compatible microprocessor. The CPU local bus 165 is exemplary of a PENTIUM-compatible style local bus. The CPU local bus 165 includes a set of data lines, a set of address lines, and a set of control lines (not shown individually). Alternatively, the CPU core 50 and CPU local bus 165 may support other instruction set operations, without departing from the principles of the present invention.

Thus, according to normal convention, the processor 100 couples to other peripheral computer components through one or more external buses, such as system bus 125, peripheral bus 120, and memory bus 170. Various peripheral devices (such as peripheral device 140) may reside on these busses. These peripheral devices may include memory devices, network cards or other structures which could be the target of a read or write request by the CPU core 50 or some other system component.

Referring still to FIG. 1, the present invention preferably includes a cache memory 25 and a cache controller 75. As noted above, the cache memory 25 functions as an intermediate storage device to store recently accessed data, as long as that data is determined to be cacheable. The cache controller 75 stores address tag and state information. The address tag indicates a physical address in system memory 175 or in external memory (such as may be represented by peripheral device 140, for example) corresponding to each entry within cache memory 25. In accordance with normal convention, each entry within cache memory 25 is capable of storing a line of data. Cache controller 75 also preferably includes an address tag and state logic circuit that contains and manages the address tag and state information, and a comparator circuit for determining whether a cache hit has occurred. Although not shown, the cache controller 75 may include other logical elements, including for example a snoop write-back circuit that controls the write-back of dirty data within cache memory 25. It will be appreciated by those skilled in the art that cache controller 75 may contain other additional conventional circuitry to control well-known caching functions such as various read, write, update, invalidate, copy-back, and flush operations. Such circuitry may be implemented using a variety of specific circuit configurations. Examples of such specific circuit configurations may be found in a host of publications of the known prior art, including U.S. Pat. No. 5,091,845 issued to Rubinfeld on Feb. 25, 1992 and U.S. Pat. No. 5,091,846 issued to Sachs et al. on Feb. 25, 1992.

Figure 3:
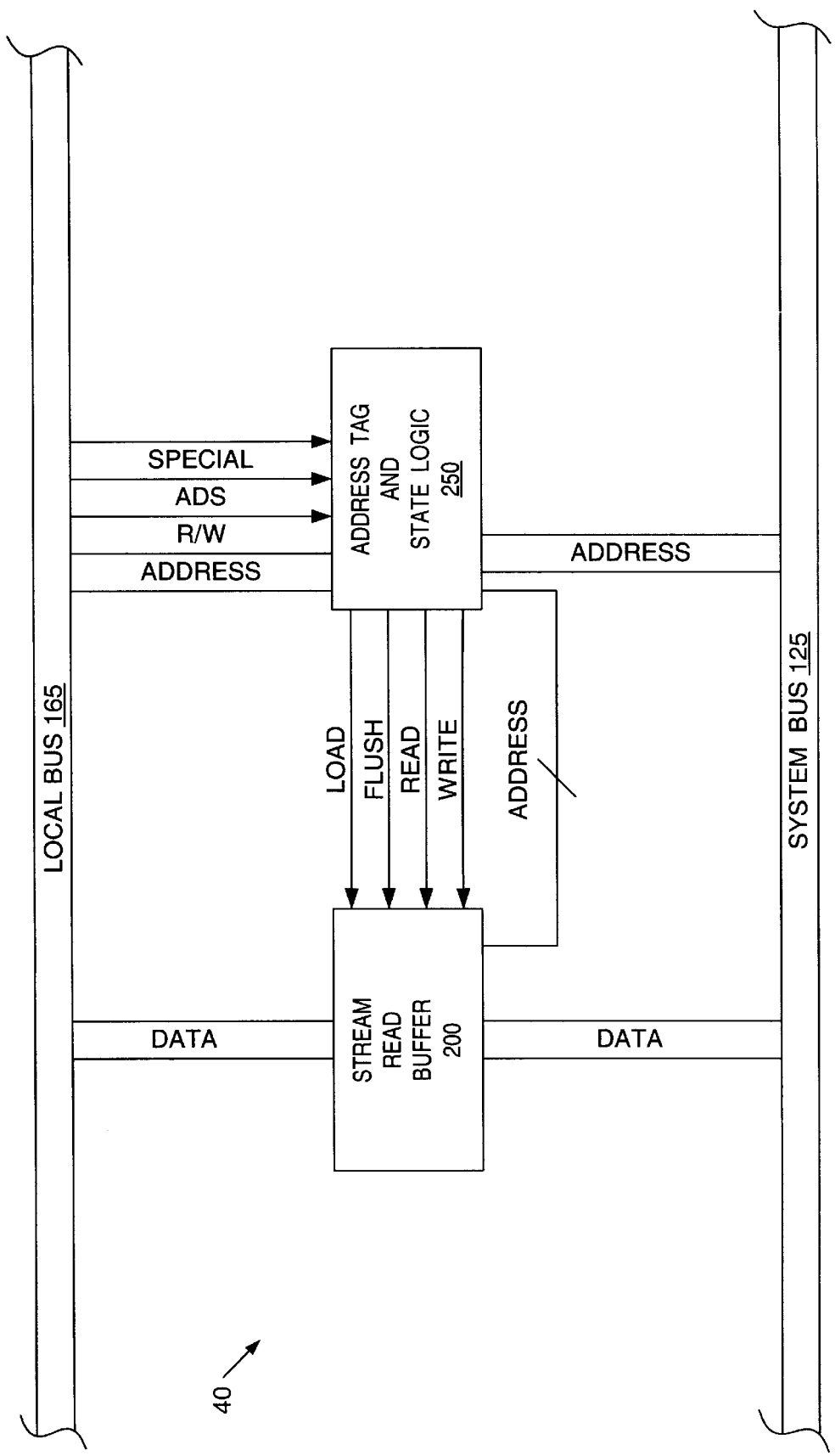
FIG. 3 is a diagram of a BIU constructed in accordance with the preferred embodiment.

Referring now to FIGS. 1 and 3, the bus interface unit (BIU) 40 preferably includes a stream read buffer 200 and associated tag and state logic circuitry 250 in accordance with the preferred embodiment of the present invention. The BIU 40 couples to both the local bus 165 and the system bus 125 for orchestrating the transfer of address, data and control signals between these respective busses. In accordance with the principles of the present invention, the BIU 40 monitors certain control signals and address ranges to load the stream read buffer (SRB) 200, and to cause the stream read buffer to write its contents back to the original address location.

The stream read buffer 200 preferably comprises one or more data buffers with a length of N bytes. The stream read buffer 200 functions to temporarily store blocks of data from a non-cacheable address and/or from block-accessed devices when that address is the subject of a read cycle. When the BIU 40 determines that a block-accessed device is the target of a read request, the BIU 40 preferably causes a large block of the block-accessed device to be read into the stream read buffer 200 to improve the efficiency of the data transfer, with the expectation that the data stored in the stream read buffers will be subsequently accessed again. Similarly, if the BIU 40 determines that a read request is made to a non-cacheable location in the computer system, the BIU preferably causes the stream read buffer 200 to load a block of data from the target device to improve the efficiency of the data transfer.

FIG. 3 is an exemplary embodiment of one way in which the stream read buffer 200 may be implemented in a system component such as the BIU 40, with the understanding that many other implementations may be developed, including both software and hardware. As one skilled in the art will understand, modifications can be made to the configuration of FIG. 3 to adapt it for use in other components not coupled to the local and system buses. The implementation of FIG. 3 preferably comprises stream read buffer 200, and address tag and state logic 250. One skilled in the art will understand that these or other components may be located in other locations in the computer system without departing from the principles of the present invention.

As shown in FIG. 3, the stream read buffer 200 couples via a data bus 195 to both the local bus 165 and to the system bus 125. In this fashion, the stream read buffer 200 is capable of loading and writing data to and from the system bus 125, while being readily accessible by the CPU core 50 (FIG. 1) via the local bus 165. The stream read buffer preferably receives an address signal, a LOAD signal, a FLUSH signal, a WRITE signal, and a READ signal from the address tag and state logic 250. In response to the LOAD signal, the stream read buffer loads data signals from the system bus 125 for temporary storage. In response to a FLUSH signal, the stream read buffer 200 drives out its contents onto the system bus 125. If desired, the address tag and state logic 250 may specify an address range to the stream read buffer 200 to cause the stream read buffer 200 to only load or flush certain portions of its contents. In response to a READ signal (or WRITE signal) and a valid address signal from the state logic 250, the stream read buffer 200 drives out data corresponding to the requested address onto the local bus 165. Similar read and write cycles can result in data being driven into the system bus 125 if the cycle is initiated by an external bus master.

The address tag and state logic 250 preferably receives a plurality of control signals from the local bus 165 and/or system bus 125, including a read/write (R/W) signal, an address status (ADS) signal, a cache enable (KEN) signal, and a special mode (SPECIAL) signal. FIG. 3 only illustrates local bus control signals for the sake of simplicity. The address tag and state logic 250 also preferably receives address signals from the local bus, and both transmits and receives address signals on the system bus 125.

In accordance with normal convention, the ADS signal indicates the beginning of a new bus cycle. Similarly, the read/write (R/W) line typically indicates whether a particular bus cycle is a read or write request. The cache enable (KEN) signal indicates whether the target address is cacheable or not. The special mode (SPECIAL) signal indicates that the CPU core or other bus master has requested a stream read buffer operation. In response to receipt of the various control signals and address signals, the address tag and state logic 250 controls operation of the stream read buffer 200.

The address tag and state logic circuit 250 indicates a physical address in the memory devices in the computer system corresponding to each line entry within the SRB 200. As will be better understood from the following, the address tag and state logic 250 preferably monitors cycles executing on local bus 165 and system bus 125 and detects the initiation of a memory cycle (i.e., read or write cycle) by the CPU core or any alternate bus master device in the computer system 100. It is noted that such a cycle could be initiated by peripheral device 140 or by other local bus peripherals, as well as the CPU core 50.

Figure 2:
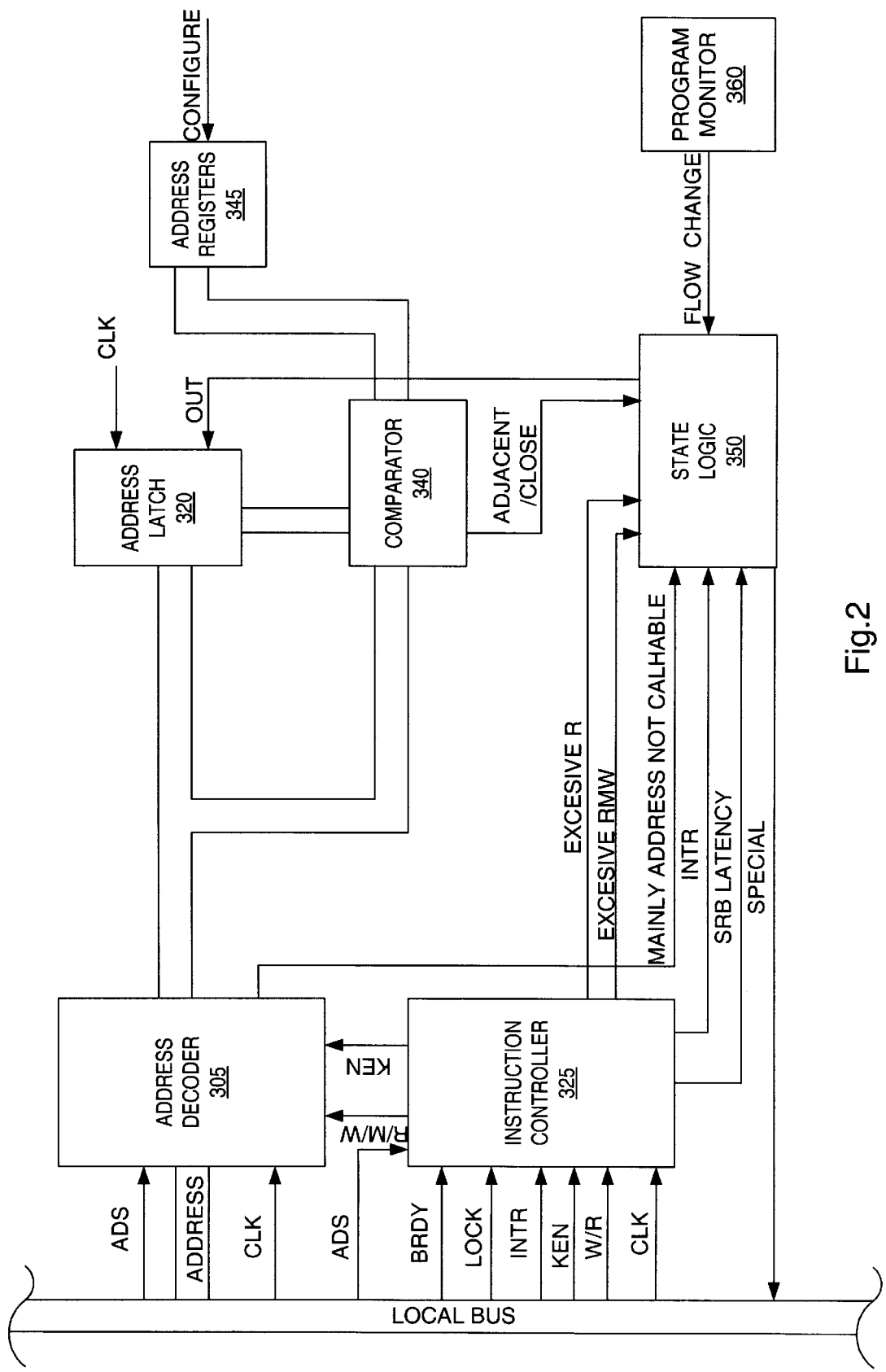
FIG. 2 is a diagram of a CPU core constructed in accordance with the preferred embodiment.

Referring now to FIG. 2, several methods may be implemented for determining when the CPU asserts a SPECIAL signal, thus causing the BIU 40 to enter a stream read buffer mode.

As shown in FIG. 2, the CPU core 50 monitors the instruction stream and information provided by the memory sub-systems to make "intelligent" decisions about when to enter and exit a stream read mode. Referring still to FIG. 2, an exemplary embodiment of a CPU core 50 is depicted which includes an address decoder 305 coupled to the local bus 165, an instruction controller 325, an address latch 320, a set of programmable address registers 345, a comparator 340, and state logic 350.

In the exemplary embodiment of FIG. 2, the address decoder 305 couples to the local bus 165 and receives address signals appearing on the local bus. The address decoder 305 receives an address status (ADS) signal indicating the beginning of a new bus cycle. Address decoder 305 also receives a clock (CLK) signal from bus 165. In addition to the signals received via the local bus 165, the address decoder 305 also receives a cache enable (KEN) signal and a read/modify/write (R/M/W) signal from either instruction controller 325 or directly from bus 165. In the embodiment of FIG. 2, the address decoder 305 determines when an address is accessed which is not cacheable, and in response, a signal is provided to the state logic 350.

The instruction controller 325 in similar fashion couples to the local bus 165 to monitor instruction signals appearing on the local bus 165. Preferably included among instruction signals monitored by instruction controller 325 are the ADS signal, a burst ready (BRDY) signal, a bus lock (LOCK) signal, an interrupt (INTR) signal, cache enable (KEN) signal, a read/write (R/W) signal, and a clock (CLK) signal. The BRDY signal, in accordance with normal convention, indicates completion of a data transfer. The bus lock (LOCK) signal is asserted during a locked cycle to indicate the processor is performing a read-modify-write operation, and that both the read operation and write operation must be allowed to complete as a combined operation. The interrupt (INTR) signal is used to generate interrupts of the CPU. The cache enable (KEN) signal indicates whether the data accessed is cacheable. The read/write (R/W) signal is used in conjunction with other signals to distinguish bus cycles and special cycles. In the exemplary embodiment of FIG. 2, the instruction controller 325 provides the KEN signal to the address decoder 305, and also provides a signal indicating whether the current cycle is a read-modify-write cycle. Instruction controller 325 also provides an interrupt (INTR) signal to state logic 350, as well as a signal indicating an excessive latency between accesses to the stream read buffer.

The address latch 320 receives a clock (CLK) signal, and also receives the address signal from the address decoder 305 on the clock following receipt of the address by the decoder 305. Subsequently, if another address is accessed which is not cacheable, the state logic causes the contents of the address latch 320 to be driven out to comparator 340.

Comparator 340 receives address signals from address decoder 305 and address latch 320. In the exemplary embodiment of FIG. 2, the comparator 340 determines if the addresses contained in decoder 305 and latch 320 are adjacent, or within a predetermined range of each other. If so, an appropriate signal is provided to state logic 350. In addition, comparator 340 also may receive address ranges stored in address register 345 for comparison with the address in address decoder 305. Preferably, address registers 345 are programmable to permit the address values to be altered either by the system programmer or internally by the CPU 50.

In the exemplary embodiment of FIG. 2, a program monitor 360 is provided to monitor flow changes in the executing program. If a major flow change is detected, an appropriate signal is provided to the state logic 350.

State logic 350 receives the signals from the address decoder 305, instruction controller 325, comparator 340 and program monitor 360, and based upon these signals, determines whether to enter a SPECIAL mode of operation, as indicated by the assertion of the SPECIAL signal. If desired, other control signals also may be monitored to customize the operation of state logic 350.

Referring still to FIG. 2, the operation of the CPU core 50 will now be discussed. As will be apparent to one of ordinary skill in the art, determination of whether to enter or exit the SPECIAL mode can be based upon a number of different criteria. Thus, it should be understood that the following criteria for deciding whether to enter or exit the SPECIAL mode is not considered inclusive, and modifications or additions may be made by one of ordinary skill in the art. In addition, any of the criteria for entering or exiting the SPECIAL mode may be used to the exclusion of other criteria, or the system may be configured to examine various combinations, or all, of the criteria in normal operation.

A first method for entry of the Special Stream Read Buffer mode occurs during any unlocked read-modify-write cycle to a non-cacheable location. Thus, for example, if the instruction stream monitored by controller 325 contains an unlocked arithmetic logic unit (ALU) operation with memory as a target, and the memory location is non-cacheable, the state logic 350 would place the system in the Special Stream Read Buffer mode.

As an alternative, or in addition thereto, the Special mode may be entered if multiple read-modify-write operations are made to successive addresses in memory. In this embodiment, the contents of the memory latch (indicative of the previous read-modify-write cycle to a non-cacheable location) are compared in comparator 340 with the contents of the address decoder 305 (indicative of the current read-modify-write cycle to a non-cacheable location). If the addresses are adjacent, the state logic asserts the SPECIAL signal to cause the system to enter a Stream Read Buffer mode. As yet another alternative, the comparator could check the addresses in the latch 320 and decoder 305 to determine if the addresses are within a predetermined range set by the system programmer.

A fourth possible method for entering the Stream Read Buffer mode is for the instruction controller 325 to count the number of read-modify-write cycles which occur in an interval of N clock cycles. If this number exceeds some threshold T, then the state logic is notified of this situaiton, and the SPECIAL signal is asserted to indicate entry of the Special mode. In this embodiment, the number N of clock cycles and threshold T may be fixed or programmable.

A fifth possible method for entering the Stream Read Buffer mode would be upon detection of multiple read cycles to successive addresses in memory. Alternatively, the Special mode could be entered on multiple read cycles to nearby memory addresses. Yet another method could be an excessive number N of read cycles to non-cacheable memory locations in a time period T.

As yet another alternative, the Special mode can be entered whenever any non-cacheable reads are made to an address range specified by address registers 345. If the comparator 340 determines that the current read cycle accesses an address within the range specified by registers 345, the state logic 350 enters the Special Stream Read Buffer mode.

Lastly, the Stream Read Buffer mode may be entered if the memory timing response becomes excessive. Thus, in this embodiment, the instruction controller 325 stores the actual latency experienced in accessing the previous X locations, where the locations were non-cacheable. If the latency for an access to a near location was greater than some threshold value Y. then the state logic would enter the Stream Read Buffer mode. In this embodiment, the value Y could be fixed, or programmable.

In similar fashion, the exit from the Stream Read Buffer mode can be accomplished by a number of methods. One method would be to exit the Stream Read Buffer mode after some number A of clock signals had occurred without a read or write cycle to or from a stream read buffer location, and no loads or flushes of the Stream Read Buffer had occurred.

A second method for exiting the Special Stream Read Buffer mode would be in response to an interrupt request to the CPU core 50. Similarly, the Special mode could be exited if the program monitor detects a major program flow change or change in operating privilege level in the executing software.

Numerous variations and modifications will become apparent to those skilled in the art once the above disclosure is fully appreciated. It is intended that the following claims be interpreted to embrace all such variations and modifications.

What is claimed is:

1. A system, comprising:
   a central processing unit (CPU) core configured to execute instructions and request memory accesses of data in one or more memory devices coupled to a system bus;
   a stream read buffer coupled to said CPU core, wherein said stream read buffer is configured to receive and temporarily store non-cacheable or block data from the one or more memory devices in response to a read access of the non-cacheable or block data during a stream read buffer mode; and
   logic configured to determine when to enter said stream read buffer mode, wherein said logic determines when to enter said stream read buffer mode according to information about said instructions and memory accesses information.

2. The system as recited in claim 1, further comprising a cache memory configured to handle memory access requests from said CPU core when not in said stream read buffer mode.

3. The system as recited in claim 1, further comprising:
   a bus interface unit configured to interface said CPU core to the system bus;
   wherein said CPU core, said bus interface unit, and said logic are comprised with a microprocessor; and
   wherein said stream read buffer is part of said bus interface unit.

4. The system as recited in claim 1, wherein said logic configured to determine when to enter said stream read buffer mode is comprised as part of said CPU core.

5. The system as recite in claim 1, wherein said logic is configured to indicate entry of said stream read buffer mode when said information about said instructions and said memory accesses information indicate an unlocked read-modify-write cycle to a non-cacheable memory location.

6. The system as recited in claim 1, wherein said logic is configured to indicate entry of said stream read buffer mode when said information about said instructions and said memory accesses information indicate multiple read-modify-write cycles to successive memory addresses.

7. The system as recited in claim 1, wherein said logic is configured to indicate entry of said stream read buffer mode when said information about said instructions and said memory accesses information indicate multiple read-modify-write cycles to memory addresses within a predetermined range of each other.

8. The system as recited in claim 1, wherein said logic is configured to indicate entry of said stream read buffer mode when said information about said instructions and said memory accesses information indicate multiple read-modify-write cycles to non-cacheable memory locations within a predetermined time period.

9. The system as recited in claim 1, wherein said logic is configured to indicate entry of said stream read buffer mode when said information about said instructions and said memory accesses information indicate multiple read cycles to successive memory addresses.

10. The system as recited in claim 1, wherein said logic is configured to indicate entry of said stream read buffer mode when said information about said instructions and said memory accesses information indicate multiple read cycles to memory addresses within a predetermined range of each other.

11. The system as recited in claim 1, wherein said logic is configured to indicate entry of said stream read buffer mode when said information about said instructions and said memory accesses information indicate multiple read cycles to non-cacheable memory locations within a predetermined time period.

12. The system as recited in claim 1, wherein said logic is configured to indicate entry of said stream read buffer mode when said information about said instructions and said memory accesses information indicate a read cycle to a non-cacheable memory address in a predetermined address range.

13. The system as recited in claim 1, wherein said logic is configured to indicate entry of said stream read buffer mode when said information about said instructions and said memory accesses information indicate a memory access latency period for one or more previous memory accesses to non-cacheable memory locations exceeds a predetermined threshold value.

14. The system as recited in claim 1, wherein said logic is configured to indicate exit from said stream read buffer mode if said stream read buffer is not accessed within a predetermined number of CPU clock cycles.

15. The system as recited in claim 1, wherein said logic is configured to indicate exit from said stream read buffer mode if an interrupt signal is received by the CPU core.

16. The system as recited in claim 1, wherein said logic is configured to indicate exit from said stream read buffer mode if a program flow change occurs in a program being executed by said CPU core.

17. The system as recited in claim 1, further comprising:
   address tag and state logic for controlling the operation of said stream read buffer; and
   wherein said logic configured to determine when to enter said stream read buffer mode is configured to indicate said stream read buffer mode to said address tag and state logic.

18. The system as recited in claim 17, wherein said address tag and state logic indicates an address for each entry in said stream read buffer.

19. The system as recited in claim 1, wherein said logic configured to determine when to enter said stream read buffer mode comprises:
   an address comparator configured to compare an address for a current memory access to a previous address or to an address range; and
   state logic configured to receive said information about said instructions and said memory accesses information; wherein said memory accesses information comprises an output from said address comparator.

20. The system as recited in claim 19, wherein said address comparator is configured to compare the address for the current memory access to said address range, and wherein said address range is programmable.

21. A method for controlling a stream read buffer mode, comprising:
   monitoring central processing unit (CPU) instructions;
   monitoring memory access information for memory accesses from the CPU;
   determining when to enter the stream read buffer mode according to information about said instructions and said memory accesses information
   entering the stream read buffer mode in response to said determining; and
   receiving and temporarily storing non-cacheable or block data in response to read accesses of the non-cacheable or block data during the stream read buffer mode.

22. The method as recited in claim 21, further comprising caching memory accesses when not in said stream read buffer mode.

23. The method as recited in claim 21, wherein said determining comprises comparing an address for a current memory access to a previous address or to an address range.

24. The method as recited in claim 21, wherein said determining comprises indicating entry of said stream read buffer mode when said information about said instructions and said memory accesses information indicate an unlocked read-modify-write cycle to a non-cacheable memory location.

25. The method as recited in claim 21, wherein said determining comprises indicating entry of said stream read buffer mode when said information about said instructions and said memory accesses information indicate multiple read-modify-write cycles to successive memory addresses.

26. The method as recited in claim 21, wherein said determining comprises indicating entry of said stream read buffer mode when said information about said instructions and said memory accesses information indicate multiple read-modify-write cycles to memory addresses within a predetermined range of each other.

27. The method as recited in claim 21, wherein said determining comprises indicating entry of said stream read buffer mode when said information about said instructions and said memory accesses information indicate multiple read-modify-write cycles to non-cacheable memory locations within a predetermined time period.

28. The method as recited in claim 21, wherein said determining comprises indicating entry of said stream read buffer mode when said information about said instructions and said memory accesses information indicate multiple read cycles to successive memory addresses.

29. The method as recited in claim 21, wherein said determining comprises indicating entry of said stream read buffer mode when said information about said instructions and said memory accesses information indicate multiple read cycles to memory addresses within a predetermined range of each other.

30. The method as recited in claim 21, wherein said determining comprises indicating entry of said stream read buffer mode when said information about said instructions and said memory accesses information indicate multiple read cycles to non-cacheable memory locations within a predetermined time period.

31. The method as recited in claim 21, wherein said determining comprises indicating entry of said stream read buffer mode when said information about said instructions and said memory accesses information indicate a read cycle to a non-cacheable memory address in a predetermined address range.

32. The method as recited in claim 21, wherein said determining comprises indicating entry of said stream read buffer mode when said information about said instructions and said memory accesses information indicate a memory access latency period for one or more previous memory accesses to non-cacheable memory locations exceeds a predetermined threshold value.

33. The method as recited in claim 21, further comprising exiting from said stream read buffer mode if said stream read buffer is not accessed within a predetermined number of CPU clock cycles.

34. The method as recited in claim 21, further comprising exiting from said stream read buffer mode if an interrupt signal is received by the CPU core.

35. The method as recited in claim 21, further comprising exiting from said stream read buffer mode if a program flow change occurs in a program being executed by said CPU core.

* * * * *